Oct. 4, 1960 H. J. WILLIAMS 2,954,669
FUEL CONTROL SYSTEM FOR GAS TURBINES HAVING SEPARATE
INLET PRESSURE AND TEMPERATURE COMPENSATING
MEANS IN BY-PASS CONDUIT
Original Filed Aug. 10, 1948 2 Sheets-Sheet 1
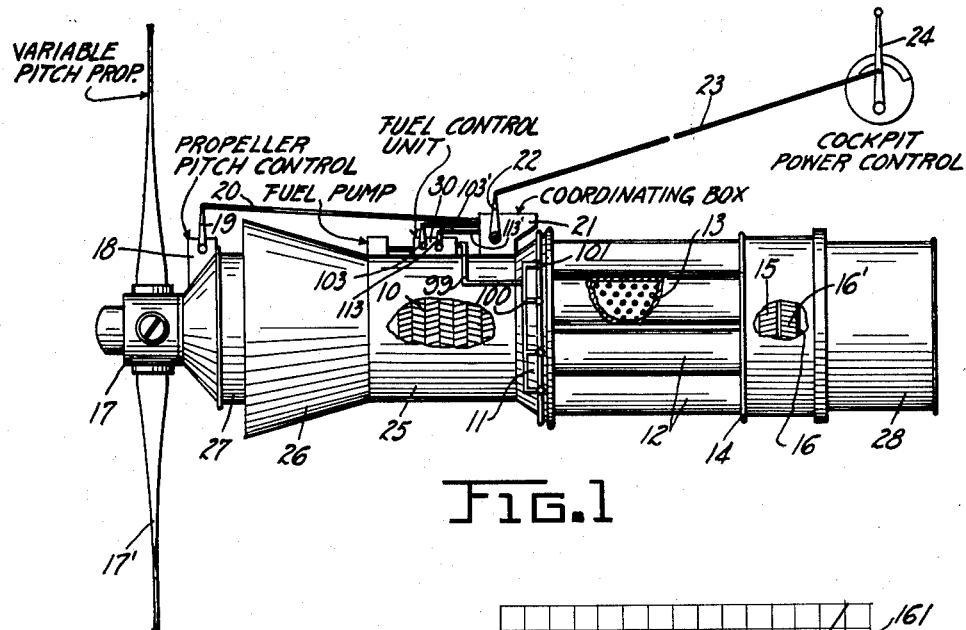
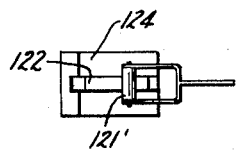
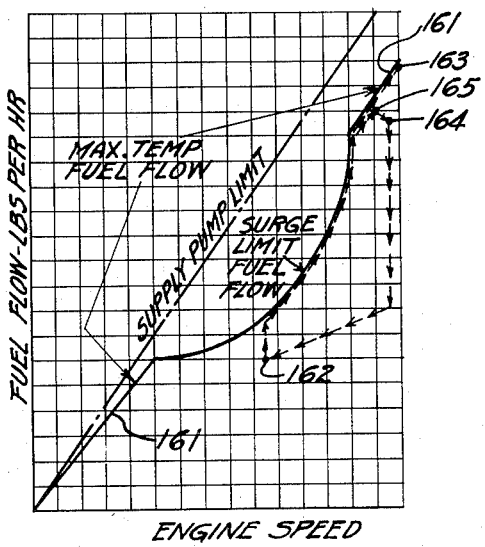
INVENTOR
HOWARD J. WILLIAMS
BY
ATTORNEY

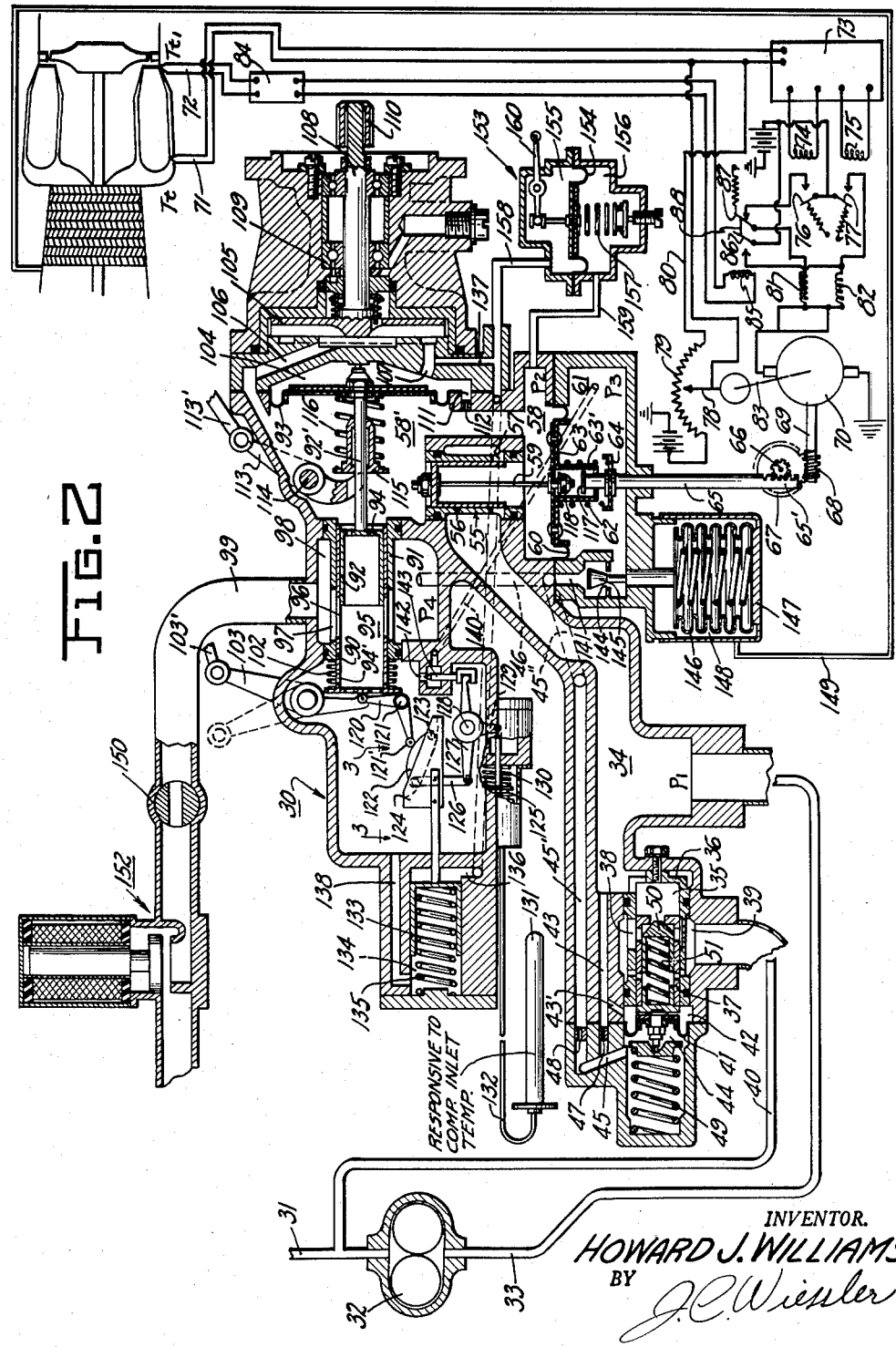

United States Patent Office 2,954,669
Patented Oct. 4, 1960

2,954,669

FUEL CONTROL SYSTEM FOR GAS TURBINES HAVING SEPARATE INLET PRESSURE AND TEMPERATURE COMPENSATING MEANS IN BY-PASS CONDUIT

Howard J. Williams, South Bend, Ind., assignor to The Bendix Corporation, a corporation of Delaware Original application Aug. 10, 1948, Ser. No. 43,463, now Patent No. 2,786,331, dated Mar. 26, 1957. Divided and this application Mar. 23, 1954, Ser. No. 418,058

3 Claims. (Cl. 60—39.28)

This is a divisional application of Howard J. Williams, Patent No. 2,786,331, issued March 26, 1957.

This invention relates to a fuel feed and power control system for gas turbine engines and more particularly for aircraft gas turbine engines designed to operate under widely varying conditions of air intake pressure and temperature. As is well known, fuel supply systems for such engines require means for automatically adjusting the rate of fuel feed as a function of the pressure and temperature of the air flowing to the engine.

This invention is an improvement over the fuel control device disclosed by Frank C. Mock in Patent No. 2,644,513, issued July 7, 1953 (filed October 6, 1945), and assigned to the assignee of the present application, wherein compensation for changes in density is had by automatically varying the fuel head across a throttle valve through the medium of an air density compensating bleed-off circuit which by-passes the throttle valve. My invention utilizes a basically similar type of bleed-off circuit but with improved means for compensating the fuel head as a function of engine air inlet pressure and temperature.

It is therefore one of the objects of the present invention to provide a fuel control for gas turbine engines having means for accurately compensating for variations in the pressure and/or temperature of the air flowing to the engine.

Another object of this invention is to provide a fuel control device having a density compensating system wherein the controlling elements or units may be readily calibrated, serviced and tested.

The foregoing and other objects and advantages will become apparent in view of the following description taken in conjunction with the drawings, wherein:

Figure 1 is a view in side elevation and partly broken away of a gas turbine propeller engine equipped with a fuel control system in accordance with the invention;

Figure 2 is a sectional schematic of the fuel control system;

Figure 3 is a sectional detail of the temperature and speed responsive cams which coact with the feed valve to limit fuel feed as a function of compressor inlet temperature and engine speed, the section being taken on the line 3—3 of Figure 2; and Figure 4 is a curve chart which illustrates the general fuel requirements of the engine in relation to engine speed.

In the following description, the term "engine" is used to designate a power unit including a burner or generator, a gas turbine and a dynamic compressor; and the terms "burner" or "generator" are used alternatively to designate the combustion chamber in which the fuel and air are intermingled and burnt to create combustion and expansion of the air and products of combustion, as well as the spray nozzle and associated parts for spraying liquid fuel into the combustion chamber.

Referring first to Figure 1, the engine in general comprises a compressor 10 (shown as of the axial flow type) which forces air into an annular header 11 arranged to direct it to a plurality of annularly spaced combustion chambers 12, each containing a burner or generator tube 13 having air inlet holes in the walls thereof through which at least part of the air is fed for admixture with fuel to produce combustion. The burners 13 discharge into a collector ring 14 arranged to direct the hot air and products of combustion through a set of stationary distributing blades 15 against the blades 16' of a turbine rotor 16. The turbine 16 drives the air compressor 10, and these components may be mounted on a common shaft, not shown, or may be drivingly coupled through transmission mechanism. The turbine, in addition to driving the compressor, is adapted to drive a propeller 17, provided with variable pitch blades 17'. The pitch changing mechanism may be of any suitable type, and since variable pitch propellers are well known and may be purchased as a complete unit in the open market, the pitch changing mechanism is not shown in detail; it includes a control device 18 provided with a control lever 19 having connected thereto a link 20 which is shown as extending back to a coordinating box 21 housing suitable mechanism for coordinating the various engine controls, including fuel feed and propeller pitch, under a single lever 22, the latter connecting by means of a link 23 with a pilot's power control lever 24. The compressor 10 is mounted in a casing or housing 25, and forwardly of this casing is a flared air intake or cowling 26 which opens in the direction of aircraft travel. The part indicated at 27 houses the reduction gearing between the turbine and propeller drive. As will be understood, the greater part of the available energy resulting from the combustion and expansion of the precompressed air and fuel is utilized in driving the propeller while the remainder (turbine exhaust) is utilized as jet thrust in a tail cone housed in the tail piece 28.

The principal parts of the fuel supply system and coacting controls shown schematically in Figure 2 are disposed in a housing generally indicated at 30; note also Figure 1 where the unit is located adjacent the coordinating box 21. Fuel comes in from a source of supply by way of conduit 31 in which is mounted a fuel pump 32 arranged to deliver the fuel under pressure through a conduit 33 to chamber 34. The capacity of the pump should be such as to insure a supply of fuel equal to or in excess of engine demands. A by-pass fuel chamber 35 is defined by a valve housing 36 having a hollow by-pass valve 37 slidingly mounted therein, the valve and housing being ported at 38 to an annular return chamber 39 in communication with a return conduit 40 leading back to the conduit 31. The valve 37 has a stem to which is connected a diaphragm 41 subjected to the differential between pump delivery pressure (indicated as P1 pressure in Figure 2) and metered fuel pressure, or the pressure of fuel leaving the control (indicated as P4 pressure in Figure 2). Accordingly, there is a chamber 42 on one side of said diaphragm which is vented to P1 pressure by means of passage or duct 43, 43', and a chamber 44 on the opposite side of the diaphragm which is vented to P4 pressure by means of a series of communicating passages or ducts indicated at 45, 45', 45'', 46. Bleeds or restrictions 47 and 48 are interposed in the passages 43 and 45' for regulating the flow through the balance pressure circuit provided by the said passages, and a spring 49 is mounted in chamber 44 and exerts a predetermined substantially constant closing thrust on valve 37. The fuel supply pressure P1 in chamber 34 will be maintained at a constant value above metered fuel pressure P4 as determined by the strength of spring 49, or in other words, there will be a constant pressure drop across the fuel control unit which is maintained regardless of altitude. The control is thus rendered insensitive to changes in pressure at the burner nozzles as long as the pump 32 is capable of meeting the demand.

A maximum pressure relief valve 50 is slidingly mounted in the hollow by-pass valve 37 and is normally urged toward closed position by a spring 51, the latter having sufficient force to hold the valve 50 closed as long as a predetermined maximum pressure at the burner nozzles is not exceeded. This insures against overloading of the engine and reduction gearing while at the same time it permits maximum fuel flow to the engine consistent with maximum load; and it also prevents excessive pressures from damaging the fuel system should the cut-off valve be suddenly closed at high engine speeds, as for example, in an emergency.

A regulator valve is indicated at 55; it is shown as being in the form of a hollow cylindrical member mounted to slide in a housing 56, the latter being formed with one or a plurality of ports 57 controlling flow of fuel from chamber 34 to chambers 58, 58' of the regulator. Valve 55 has a stem 59 which is connected to a diaphragm 60 overlying a chamber 61. A spring 62 encircles a hollow cylindrical projection 63' formed integral with a lower diaphragm plate 63 and acts in a direction tending to open valve 55 against the differential between P2 pressure in chamber 58 and P3 pressure in chamber 61.

The tension or spring force of spring 62 is a function of compressor discharge temperature $T_t$, and accordingly the lower end of said spring is abutted by a plate 64 secured on a rod 65 having a toothed portion or rack bar 65' in mesh with a pinion 66 forming part of a worm drive including gear 67 adapted to be rotated by a worm 68 secured on the end of a shaft 69 driven by an actuator shown in the form of a direct current reversible electric motor 70, the latter being controlled by means adapted to respond to changes in temperature at the compressor outlet or burner input temperature $T_t$, plus a safety override responsive to turbine input temperature $T_{t1}$. An example of such means is shown diagrammatically in Figure 2; it includes a pair of thermocouples 71 and 72, located to obtain the response above indicated. The thermocouples 71 acts through a normally balanced electronic amplifier and control unit, indicated in block diagram at 73, to energize a pair of relay coils 74 and 75, depending upon the direction of unbalance, which coils when energized close either one of a pair of normally open relay switches 76 and 77. One lead of the thermocouple 71 is electrically connected to a rotatable potentiometer slide 78 arranged to act on a resistance 79 forming part of a reference voltage circuit 80. When switch 76 is closed (assuming temperature below maximum safety temperature), field coil 81 is energized to drive the motor 70 in one direction, and when switch 77 is closed, field coil 82 is energized to drive the motor in the opposite direction. In the example shown, when coil 81 is energized, it causes motor 70 to rotate in a direction to move rod 65 upwardly and cause more fuel to be fed to the burners at a given throttle position and at which time the $T_t$ temperature would be decreasing. The motor 70 has a mechanical connection, indicated in dotted lines at 83, with the slider 78 so as to reset the latter when the circuit to the motor is closed and balance the control unit 73 at the changed setting of the regulator valve 55.

The thermocouple 72 forms part of a maximum temperature limitation circuit; it acts through an amplifier 84 to energize relay coil 85 when the turbine inlet temperature exceeds a predetermined value, said coil when energized closing normally open relay switch 86 and simultaneously opening normally closed switch 87, there being a mechanical connection 88 between these two latter switches. When switch 87 is opened, the motor circuit to field coil 81 is broken, and when switch 86 is closed, a separate supply circuit to the field coil 82 is closed and the motor 70 is rotated in a direction to cause less fuel to be fed to the burners, thereby reducing the temperature at the turbine inlet. The manner in which the temperature control coacts with the regulator valve 55 to establish a predetermined fuel feed for a given temperature will be more fully set forth in the description of operation of the invention.

For a more complete illustration and description of a temperature responsive control capable of effecting the desired results as far as the present invention is concerned, reference may be had to the copending application of H. C. Waterman, Serial No. 792,409, filed December 18, 1947 (common assignee).

A fuel feed or throttle valve is designated at 90; in the form shown it consists of a hollow cylinder slidably mounted in a bushing or housing 91. A speed responsive governor valve 92 is also movably mounted in the bushing 91; it has a stem 92' connected to a spring loaded speed responsive diaphragm 93, the function of which will presently be described. Fuel at a metering head determined by the regulator flows from chamber 58' through ports 94 and 94' into passage 95 defined by the hollow valves 92 and 90, and thence through variable metering restrictions 96 and 97 into metered fuel chamber 98, from which it flows by way of conduit 99 to a fuel manifold 100 (note Figure 1) which supplies fuel to a series of fuel discharge nozzles 101 adapted to discharge the fuel under pressure into the respective burner tubes 13. The particular construction of the nozzles 101 forms no part of the present invention; for a suitable type of nozzle reference may be had to the copending application of Morris O. Wise, Serial No. 748,214, filed May 15, 1947, now Patent Number 2,569,033. The throttle valve 90, Figure 2, is normally urged toward open position or in a power increasing direction by a spring 102, and may be adjusted manually by means of a throttle lever 103. While this lever may be independently controlled, it is preferably correlated with one or more of the other engine controls through the coordinating unit 21 and accordingly it has an operative connection with said unit by means of a link rod 103'.

Reverting to the speed governor valve 92, the diaphragm 93 which controls this valve forms a movable wall between chamber 68' and a chamber 104. An engine driven centrifugal pump or impeller 105 takes fuel from chamber 58' by way of a passage 106 and forces it into chamber 104 by way of a passage 107. Pump impeller 105 is carried by a shaft 108, which is rotatable in sealed bearings 109 and has secured on the outer end thereof a pinion 110 adapted to be driven from the engine. Chamber 104 is vented to chamber 58' by way of a passage 111 having a restriction 112 therein.

Since the impeller is rotated in relation to engine speed, it will produce a pressure differential across the diaphragm 93 proportional to the square of engine speed, and hence the valve 92 will be positioned as a function of engine speed. The speed governor setting is preferably by means of a lever 113 which is pivoted or fulcrumed at 114 and at its lower or inner end is forked and engages a bushing 115, the latter being slidable on valve stem or shaft 92' and bearing against the one end of a governor spring 116. The governor lever 113 has connected to the outer end thereof a link rod 113' which projects into the coordinating box 21, Figure 1, where its travel is coordinated under one control lever with that of the throttle lever 103. Thus, the setting of lever 113 relatively to that of the throttle 103 may be adjusted, either manually or through coordinated cam action, to enable the valve 92 to become effective against dangerous overspeeds of the turbine and compressor mechanism, not only at maximum power settings, but also at ground idle when the propeller is normally in fixed pitch, and also when it is in reverse pitch for reverse thrust speed control.

The upper end of the rod 65 is provided with a contact head 117 adapted to engage the contiguous end of a screw 118 when the $T_t$ temperature is low and the differential across the diaphragm 60 causes the regulator valve to approach its fully closed position, a condition which may exist at low idle speeds and corresponding throttle settings.

The contact head 117 is also adapted to engage the bottom of the cup-shaped member 63' in the event of an over-temperature condition not relieved by reducing the tension on spring 62. Thus, should the rise in $T_t$ temperature be such as to cause movement of rod 65 downward to a point where the contact 117 engages the bottom wall of 63', the regulator valve will immediately be moved to or toward closed position and reduce the rate of fuel feed to the burners. Again, should the diaphragm 60 rupture or break, the same action would prevent the regulator valve 55 from moving to a wide open position and produce a dangerous temperature rise.

A dynamic compressor tends to surge or stall when the discharge pressure varies with respect to inlet or intake pressure to a point where the normal flow characteristics through the compressor are disturbed by high back pressure. With gases such as air, the surge or stall appears as a condition of periodic oscillation between normal onward flow and actual rebound out of the entrance to the compressor. In a gas turbine engine where the compressor is mounted on the same shaft as the turbine wheel, and where efficiency requires close matching of the compressor and turbine capacities, compressor stall or surge becomes a serious problem.

In Figure 4, a hypothetical compressor stall or surge limit for a given outside or compressor inlet temperature is indicated.

In the present invention, surge limit fuel feed at below maximum temperature conditions is automatically controlled as a function of engine speed (which in turn is an index of the pressure rise across the compressor), as a function of entering air density, and as a function of compressor inlet temperature and compressor outlet temperature, the speed and compressor inlet temperature responsive controls acting to vary the throttle valve area while the compressor outlet control being that at $T_t$ above described and including the thermocouple 71 which senses compressor discharge temperature and varies the head across the throttle valve. In addition to its surge limit function, the speed control also acts to set an upper temperature limit on fuel feed during acceleration. The density control will subsequently be described.

An example of a suitable control operative as a function of engine speed and also as a function of compressor inlet temperature is illustrated more or less schematically in Figure 2. A bell crank lever 120 is pivotally anchored or fulcrumed at 121 and has one arm thereof provided with a follower bearing against the end wall of the throttle valve 90 and its other arm provided with another follower 121' bearing against the active surface of a cam 122, the latter at its one end being pivotally connected at 123 to another cam 124 (to be described) and at its opposite end being operatively connected to a temperature responsive bellows 125 by means of link 126, lever 127, shaft 128, lever 129 and rod 130. The bellows 125 has an operative connection with a thermal element such as a temperature bulb 131 by means of a flexible tube 132, the bellows and tube being loaded with suitable fluid or material responsive to changes in temperature registered by the element 131, as is well understood by those having a working knowledge of such devices. The thermal element 131 is preferably positioned at a point where it will register compressor inlet temperature.

Cam 124 is connected to a piston 133 mounted to slide in a cylindrical chamber 134 against the resistance of a loading spring 135. Chamber 134 to the right of piston 133 is in fluid communication with the pressure side of the centrifugal pump or impeller 105 by way of passages 136, 137 and 107. The inner or left-hand side of piston 133 is vented to chamber 58' by a passage 138. The differential across the piston is, therefore, proportional to engine speed when the system is in operation.

During part throttle settings of the lever 103, the pilot has direct manual control of the throttle valve area, but at wide open throttle settings of said lever (the position in full lines in Figure 2) when the engine is operating at maximum temperature as determined by the temperature control acting through the regulator valve 55 to regulate the metering head, the piston 133 positions the cams 124 and 122 as a function of engine speed and determines the maximum opening of the throttle valve, the effective position of cam 122 being modified as a function of compressor inlet temperature, to obtain the desired surge limit fuel flows.

Upon a decrease in the density of air flowing to the engine, less fuel is required to drive the turbine and compressor at a given speed, and unless the maximum rate of fuel delivered to the engine on acceleration is correspondingly reduced, much higher burner temperatures will be experienced during acceleration at altitude than at sea level under similar engine conditions, due to the extremely rich fuel-air ratio. For an engine of the type to which the present fuel feeding system is particularly adapted, fuel flow should vary as a direct function of compressor inlet pressure and as an inverse function of compressor inlet temperature. In the preferred arrangement of the density control circuit, the temperature and pressure components are controlled by independently operating temperature and pressure responsive devices which coact to adjust the metering differential across the throttle valve for any given metering area. Since head is regulated instead of area, as far as density compensation is concerned, the throttle valve has the same travel for a given range of acceleration and deceleration at all altitudes.

Referring again to Figure 2, a passage 140 connects chamber 58' ($P2$ pressure) with chamber 61 ($P3$ pressure) while another passage 141, 46 connects chamber 61 with chamber 98 ($P4$ pressure). At the entrance to passage 140 is a variable bleed orifice 142 controlled by a contoured needle valve 143 carried by the lever 127 which is actuated as a result of changes in compressor inlet temperature registered by the bulb or thermal element 131. At the entrance to passage 141 is another variable bleed orifice 144 controlled by a contoured needle valve 145 carried by the movable end of a spring loaded evacuated pressure bellows 146 having its lower or stationary end anchored to a cup-shaped casing or housing 147 defining a pressure chamber 148. A conduit 149 communicates compressor inlet pressure to the latter chamber.

Since the regulator pressure differential across diaphragm 60 ($P2$ minus $P3$) is determined by spring 62 which responds to changes in the temperature rise across the compressor, or turbine input temperature, for a given area of orifice 142, a definite quantity of fuel flows from chamber 58' through passage 140 into chamber 61; and this same quantity must pass through the bleed area or orifice 144 controlled by the pressure needle 145 and through passage 141, 46 to chamber 98. For a given area of pressure orifice 144, this flow establishes a given pressure drop between chamber 61 and chamber 98. Upon an increase in compressor inlet pressure, bellows 146 tends to collapse, resulting in a decrease in the area of orifice 144; and for a given bleed flow, or a given position of temperature needle 143, a decrease in the area of orifice 144 increases the pressure differential between chambers 61 and 98, or $P3$ minus $P4$. Since the differential between chambers 58' and 98 ($P2$ minus $P4$) must equal the differential between chambers 58' and 61 ($P2$ minus $P3$) plus the differential between chamber 61 and chamber 98 ($P3$ minus $P4$), then $P2$ minus $P4$ must also increase, resulting in an increase in flow through the throttle valve ports for any given area of the latter. Again, a decrease in compressor inlet temperature as indicated by thermal element 131 causes needle 143 to enlarge the area of the temperature orifice 142, increasing the bleed flow through passages 140 and 141, 46; and for a given area of pressure orifice 144, this increase in bleed flow results in an increase in P3 minus P4 and a corresponding increase in P2 minus P4.

A decrease in compressor inlet pressure and/or an increase in compressor inlet temperature has the reverse effect, viz. a decrease in flow across the throttle valve.

In brief, the action of the density bleed circuit is to by-pass fuel around the throttle valve, the rate of by-pass flow being controllable as a function of pressure and temperature and therefore density, to thereby vary the drop across the throttle valve at a given position of the latter in relation to a complex function of pressure and temperature and/or changes in density.

A manual fuel cut-off valve is indicated at 150; it is usually connected to the cockpit control for completely shutting off flow of fuel to the burners when the engine is stopped. A coacting solenoid cut-off valve 152 may also be installed in the fuel conduit 99 to facilitate starting, the arrangement preferably being such that when the pilot moves the cockpit quadrant out of cut-off, the manual cut-off is opened and the solenoid cut-off closed, the latter remaining closed until the engine reaches a predetermined speed.

The unit generally indicated at 153 is a speed responsive device which may be used as a switch control or for any other purpose to which it may be adapted. It consists of a diaphragm 154 which forms a movable wall between two chambers 155 and 156 and is loaded by an adjustable spring 157, the upper chamber 155 being in pressure communication with impeller 105 by way of passages 107, 137 and 158 and the lower chamber 156 being vented to chamber 58 (P2 pressure) by passage 159. A lever 160 is operatively connected to the diaphragm 154 and may be utilized to operate one or more switches (not shown) during the starting cycle, or for other purposes. The spring 157 is preferably calibrated or adjusted to produce movement of lever 160 proportional to engine speed.

Operation

The usual method of starting gas turbine engines of the type shown is by means of an electric starting motor and coacting controls such as the starting apparatus disclosed in the copending application of A. A. Kuzmitz, Serial No. 730, 622, filed February 24, 1947 (common assignee), now Patent Number 2,667,742, the motor being engaged and the burners fired until the engine attains a self-sustaining speed, whereupon the starting circuit cuts out and the starting motor is disengaged. The idle speed or low power setting of the throttle lever 103 is indicated in dotted lines in Figure 2 (at which time the throttle valve 90 would be pushed inwardly or toward the right against the resistance of the spring 102), and the high power setting of said lever is indicated in full lines. It should be noted that the throttle valve is moved impositively by spring 102 in a power increasing direction and positively moved by lever 103 in a power decreasing direction.

The control system of the present invention enables a pilot to operate a gas turbine propeller engine freely without danger of exceeding rated capacities as to speed and temperature, without stall and with a minimum of hunting or surging. Acceleration and deceleration may be had through coordinated control of fuel feed and propeller pitch or it may be through selective control of these components. With respect to the rate of fuel feed, this is regulated by varying the area of the throttle valve metering ports and/or by varying the metering head across the said valve. Certain of the controls act through the regulator valve 55 to vary the head at any selected position of the throttle, while other of the controls act on the throttle valve 90 to vary the metering area. In Figure 4, the line 161 indicates the maximum temperature limit of fuel flow, or a maximum rate of fuel feed which may be maintained for any material length of time without endangering the burner system and correlated parts. This limit is determined by the temperature override control having its origin in the thermocouple 72, and also by the speed cam 124 in cooperation with the temperature control having its origin in the thermocouple 71. The dip in this line represents the upper limit of fuel flow to be maintained without compressor stall or surge, said flow at high power settings of lever 103 being determined by the speed responsive piston 133 and the cams 122 and 124. Part throttle fuel flows in the power range are established by manual control of throttle valve area and $T_t$ control of the metering head through regulation of the regulator valve 55.

For maximum temperature fuel flow, the metering principle may be expressed by the equation $$W_f = K_1 \frac{P_0}{T_0^x} \cdot N^y (2160° R. - T_t)$$

For part throttle operation, the metering principle may be expressed by the equation $$W_f = K_2 \frac{P_0}{T_0^x} (2160° R. - T_t)$$

where $W_f$ equals fuel flow;
$K_1$, a constant;
$P_0$, compressor inlet pressure;
$T_0$, compressor inlet or intake temperature;
$x$ and $y$, variable exponents;
$N$, engine speed;
2160° R., upper limit of turbine inlet temperature;
$T_t$, compressor outlet temperature;
$K_2$, a throttle constant.

The basic metering principle is based on the fundamental equation that quantity or rate of fuel flow through an orifice is proportional to area times the square root of the head across the orifice. For maximum temperature metering, the area of the throttle orifice or orifices 96 is controlled as a function of speed through the centrifugal pump 105 and diaphragm 93, and the metering head across the throttle valve is controlled by the temperature rise (2160 minus $T_t$) and the compressor inlet density factor $R_0$ divided by $T_0^x$. A basic head is established by the temperature rise acting through the thermocouple 71, electronic control and amplifier unit 84 and motor 70 to vary the spring loading of the regulator diaphragm 60, and this head is multiplied or increased by the density factor as the density increases.

Fuel is metered on the basis that the weight of fuel supplied to the burners should be proportional to the weight of air times the temperature rise through which the air is raised, $W_f \propto W_a$ (T2 minus T1). If we assume 2160° R. as the value of final temperature at the turbine inlet and $T_t$ the temperature at the burner inlet, the equation may be expressed as $W_f \propto W_a$ (2160 minus $T_t$). The density factor $$\frac{P_0}{T_0^x}$$

times the speed factor N in the foregoing maximum temperature equation is an expression of the air flow.

Part throttle fuel metering differs from maximum temperature fuel metering in that the speed factor is substantially removed, but the speed factor will re-enter at any time the fuel flow at part throttle should tend to exceed the maximum temperature limit, surge limit or top speed limit.

To illustrate the actual or physical operation of the control, let it be assumed that in Figure 4 the engine is operating at the point 162 and the pilot desires to accelerate to the point 163, neglecting altitude or the factor $$\frac{P_0}{T_0{}^x}$$

The throttle lever 103 would be rotated in a clockwise direction to its extreme right-hand position, whereupon the valve 90 would be moved toward the left or in an opening direction by the spring 102, increasing the area of the metering orifices 96, and the fuel feed will rise to the surge limit and follow this line and the maximum temperature line until the engine is operating at top speed for a given propeller pitch and at the upper temperature limit, which may be at maximum power output. When the throttle lever 103 is suddenly released from contact with the throttle valve 90, the latter would immediately open wide were it not restrained automatically by the speed responsive cam 124 and coacting compressor inlet temperature responsive cam 122.

However, since for an engine having a given surge characteristic, the particular location of the surge area is a function of compressor inlet temperature and engine speed, the piston 133 will position cam 124 and the temperature responsive bellows 125 will position cam 122 to determine the effective area of the throttle valve 90, while at the same time the thermocouple control at $T_t$ will sense compressor discharge temperature and act through the regulator valve 55 to maintain a predetermined metering head across the throttle valve 90; and these respective controls coact to determine the surge limit fuel flow.

As the engine speed increases, the effective action of cams 122 and 124 as regards metering area and the effective action of control $T_t$ as regards metering head modifies the rate of fuel flow until the maximum temperature line 161 is reached; and should fuel flow tend to increase beyond this line, the thermal control at $T_{t1}$ overrides the control at $T_t$ and reduces the metering head to the proper value.

Should the pilot wish to accelerate from point 162 to point 164 at a part throttle setting, then the fuel flow would rise to the surge limit and follow this line to point 165 and then drop to point 164; it may or may not reach the maximum temperature limit, depending upon conditions of operation.

Deceleration through fuel feed regulation is had primarily by manual throttling, although at any part throttle condition, the temperature responsive control at $T_t$ will influence the metering head across the throttle valve, until the contacts 117 and 118 engage, whereupon the regulator valve attains its furthest closed position. Assuming deceleration from point 164 back to point 162 by suddenly partially closing the throttle valve, then the fuel flow would be about as indicated by the deceleration arrows connecting these points. Should the throttle be suddenly moved to low idle position, the regulator valve will maintain sufficient head across the throttle valve to prevent burner failure due to extremely low fuel flows while the compressor is delivering relatively high pressures due to momentum.

In Figure 4, the respective examples of operation are assumed to take place at or near ground level density. As altitude increases, the rate of fuel feed for a given engine speed decreases, and consequently the respective fuel flow curves would swing lower toward the right-hand corner of the figure.

In the claims, the term "fuel conduit" is used to broadly define the path of flow of fuel through the fuel control unit shown in Figure 2 which connects pump discharge conduit 33 with metered fuel conduit 99.

Although only one embodiment of the invention has been illustrated and described, various changes in the form and relative arrangement of the parts may be made to suit requirements.

I claim:

1. In a fuel control device for a gas turbine engine having a burner, a fuel conduit for supplying fuel to the burner, a metering restriction in said conduit, a throttle valve for varying the area of said restriction, a regulator valve for controlling the metering head across said restriction, pressure responsive means connected to said regulator valve, means for subjecting said pressure responsive means to a force varying in relation to variations in an engine operating condition, a restricted flow passage arranged to bleed unmetered fuel from an area in pressure communication with said pressure responsive means to the fuel conduit beyond said metering restriction, said bleed passage having a pair of orifices in series therein, means responsive to changes in pressure for controlling the area of one of said orifices and means responsive to changes in temperature controlling the area of the other of said orifices.

2. In a fuel control device for an engine, a main fuel supply conduit having a metering restriction therein, a throttle valve for controlling the area of said restriction, a regulator valve for controlling the metering head across said restriction as a function of engine rotational speed, a diaphragm connected to said regulator valve, a density compensating circuit comprising a restricted flow passage arranged to bleed unmetered fuel from an area in pressure communication with said diaphragm to said main fuel conduit beyond said governor valve, a pair of orifices in series in said bleed passage, an element responsive to changes in pressure controlling one of said orifices and an element responsive to changes in temperature controlling the other of said orifices.

3. In a fuel feed and power control system for a gas turbine engine for aircraft having a burner or generator to which air is supplied under pressure by a dynamic compressor driven by the turbine, a fuel conduit for conducting fuel to the burner having a metering restriction therein, a throttle valve for varying the area of said restriction, and means for regulating the fuel head across said throttle valve including a regulating valve in said conduit, speed responsive means connected to said regulator valve, pressure responsive means connected to said regulator valve, a by-pass conduit in communication with said pressure responsive means arranged to by-pass fuel around said throttle valve, a valve in said by-pass conduit operable as a function of compressor inlet pressure, compressor inlet pressure responsive means operatively connected to said latter valve, another valve in said by-pass conduit operable as a function of compressor inlet temperature, and separate compressure inlet temperature responsive means operatively connected to said other valve, said two last mentioned valves being adapted to coact to modify said by-pass flow.

References Cited in the file of this patent

UNITED STATES PATENTS

| | | |
|---|---|---|
| 2,440,566 | Armstrong | Apr. 27, 1948 |
| 2,503,048 | Ifield | April 4, 1950 |
| 2,538,582 | Mordell et al. | Jan. 16, 1951 |
| 2,564,127 | Orr | Aug. 14, 1951 |
| 2,644,513 | Mock | July 7, 1953 |
| 2,705,047 | Williams et al. | Mar. 29, 1955 |

UNITED STATES PATENT OFFICE
CERTIFICATION OF CORRECTION

Patent No. 2,954,669            October 4, 1960

Howard J. Williams

It is hereby certified that error appears in the above numbered patent requiring correction and that the said Letters Patent should read as corrected below.

Column 4, line 44, for "68'" read -- 58' --; column 8, line 50, for "$R_0$" read -- $P_0$ --.

Signed and sealed this 6th day of June 1961.

(SEAL)
Attest:

ERNEST W. SWIDER            DAVID L. LADD
Attesting Officer            Commissioner of Patents